United States Patent
Kim

[19]

[11] Patent Number: 6,161,644
[45] Date of Patent: Dec. 19, 2000

[54] POWER STEERING SYSTEM FOR MOTOR VEHICLE

[75] Inventor: Je-deok Kim, Kangwon-do, Rep. of Korea

[73] Assignee: Mando Corporation, Kyongki-Do, Rep. of Korea

[21] Appl. No.: 09/498,428

[22] Filed: Feb. 4, 2000

[30] Foreign Application Priority Data

Feb. 10, 1999 [KR] Rep. of Korea ................... 99-0002064
May 18, 1999 [KR] Rep. of Korea ................... 99-0017901

[51] Int. Cl.$^7$ .................................................. B62D 5/99
[52] U.S. Cl. .......................................... 180/443; 180/444
[58] Field of Search ................................. 180/443, 444

[56] References Cited

U.S. PATENT DOCUMENTS

| | | | |
|---|---|---|---|
| 5,454,439 | 10/1995 | Birsching | 180/443 |
| 5,623,409 | 4/1997 | Miller | 364/424.051 |
| 5,738,182 | 4/1998 | Birsching et al. | 180/422 |
| 5,749,432 | 5/1998 | Birsching | 180/443 |
| 5,931,195 | 8/1999 | Birsching et al. | 137/625.23 |

*Primary Examiner*—J. J. Swann
*Assistant Examiner*—L. Lum
*Attorney, Agent, or Firm*—Fish & Richardson P.C.

[57] ABSTRACT

Disclosed is a power steering system for a motor vehicle. The power steering system comprises an inner toothed member fitted around a circumferential outer surface of an input shaft and having a plurality of teeth which are formed on a lower half of the inner toothed member; an outer toothed member having a plurality of teeth which are formed on a circumferential inner surface of the outer toothed member in a manner such that they face the plurality of teeth of the inner toothed member; a coil wound through a plurality of turns in a circumferential direction and above the plurality of teeth of the inner and outer toothed members; a pass plate surrounding an upper surface and a circumferential outer surface of the coil, for rendering aid to the formation of magnetic paths; a permanent magnet fitted around the outer toothed member; a magnetic pole piece sleeve fitted around the permanent magnet; and a non-magnetic pole piece sleeve arranged under the inner toothed member, the outer toothed member and the permanent magnet, the permanent magnet and the outer toothed member having one polarity, the inner toothed member having the other opposite polarity.

2 Claims, 9 Drawing Sheets

POWER STEERING SYSTEM FOR MOTOR VEHICLE

BACKGROUND OF THE INVENTION

1. Field of the Invention

The present invention relates to a power steering system for a motor vehicle, and more particularly, the present invention relates to a power steering system for a motor vehicle, which increases and decreases, upon being actuated, steering force by using electromagnetic force in a manner such that driver steering effort varies depending upon a speed of the motor vehicle.

2. Description of the Related Art

Generally, a conventional hydraulic power steering system for a motor vehicle, which utilizes a hydraulic actuator as a steering assistant force source, includes an output shaft which is connected to steerable wheels of the vehicle and a torsion bar for an input shaft which is connected to a steering wheel. The output shaft and the torsion bar are coaxially connected with each other. In the case that steering torque is exerted to the steering wheel by a driver, relative angular displacement is resulted in between the input shaft and the output shaft, in relation to torsion of the torsion bar, which is caused by the exertion of the steering torque. At this time, depending upon the relative angular displacement, by the rotation of a rotary valve which is arranged between the input shaft and a valve body, fluid pressure is supplied to a working chamber which corresponds to a steering direction, thereby generating steering assistant force.

Steering assistant force which is generated in this way, is related with steering torque and torsional displacement of the torsion bar. FIG. 1 is a graph illustrating a relationship between steering torque and torsional displacement of a torsion bar in a power steering system for a motor vehicle. From FIG. 1, it can be readily seen that, as torsional displacement of a torsion bar is increased, steering torque is also increased in proportion to the torsional displacement of the torsion bar. Therefore, because control characteristics are determined only by the torsional displacement of the torsion bar, a proportional relationship as shown in FIG. 2 is established between steering torque which is exerted to a steering wheel and steering assistant force generated by fluid pressure which is supplied to a hydraulic cylinder.

Referring to FIG. 2, there is shown a graph illustrating a relationship between steering torque and fluid pressure in a power steering system for a motor vehicle. When observing a change in fluid pressure in relation to steering torque, it is to be readily understood that, in a lowered steering torque range 'b', fluid pressure is low and is gently increased, and, in an elevated steering torque range 'a', fluid pressure is abruptly increased. Hence, when parking a vehicle or running at a low speed, because large steering assistant force is required, control characteristics of the elevated steering torque range 'a' in which fluid pressure is abruptly increased, are adopted. Also, when running at a medium speed or at a high speed, control characteristics of the lowered steering torque range 'b' in which fluid pressure is low, are adopted so that running stability is secured and the vehicle is steered with small steering assistant force.

In the meanwhile, in the case that torque value of the steering wheel is lightly established on the basis of the parking situation or the low speed running situation, because the vehicle is steered even with very small torque in the high speed running situation, a problem is caused in that straight-ahead running stability of the vehicle in the high speed running situation is deteriorated. On the contrary, in the case that torque value of the steering wheel is heavily established on the basis of the high speed running situation, a problem is caused in that it is impossible to obtain sufficient steering assistant force in the parking situation or the low speed running situation.

To cope with these problems, a vehicle speed-responsive, resistant force-generating apparatus has been developed. In the vehicle speed-responsive, resistant force-generating apparatus, depending upon a speed of a vehicle, steering torque is altered in relation to torsional displacement, and fluid pressure is altered in relation to steering torque, whereby, in a low speed running situation, large steering assistant force is achieved with small steering torque and, in a high speed running situation, steering resistant force is increased to improve running stability.

As the vehicle speed-responsive, resistant force-generating apparatus, a hydraulic resistant force-generating apparatus and an electromagnetic resistant force-generating apparatus are disclosed in the art. The hydraulic, resistant force-generating apparatus uses reaction force due to fluid pressure of a fluid flow controlling apparatus which increases a fluid supply amount when a vehicle is running at a low speed and decreases a fluid supply amount when the vehicle is running at a high speed. The hydraulic, resistant force-generating apparatus also uses mechanical reaction force of a valve. The electromagnetic, resistant force-generating apparatus alters resistant force by using electromagnetic force.

FIG. 3 is a partially broken-away perspective view illustrating an electromagnetic mechanism of an electromagnetic, resistant force-generating apparatus of a conventional power steering system for a motor vehicle.

The electromagnetic, resistant force-generating apparatus 92 as shown in FIG. 3, which is disclosed in U.S. Pat. No. 5,119,898, includes an encapsulated annular exciting coil 130, a cylindrical permanent magnet ring element 104, and a pair of rotary ferromagnetic pole pieces 106 and 108. The pair of rotary ferromagnetic pole pieces 106 and 108 are formed with a plurality of outwardly facing teeth 120 and a plurality of inwardly facing teeth 122, respectively. The cylindrical permanent magnet ring element 104 is secured to a rotor hub 110 which supports a valve body through a sleeve bearing in a manner such that the valve body can be rotated. The rotary ferromagnetic pole piece 106 which faces the cylindrical permanent magnet ring element 104, is disposed in a manner such that it can be rotated along with an elongated cylindrical spool shaft.

At this time, the cylindrical permanent magnet ring element 104 is formed in a manner such that radially magnetized polarities thereof are repeatedly alternated along a circumferential direction.

FIG. 4 is a schematic view illustrating magnetic flux of a rotary magnetic circuit of the electromagnetic mechanism of FIG. 3.

Here, FIG. 4A represents a state wherein centered alignment of magnetic paths is effected, and FIG. 4B represents a state wherein centered alignment of magnetic paths is distorted due to the movement of the cylindrical permanent magnet ring element 104.

In the case that steering torque is not exerted to a steering wheel, magnetic paths which are induced by the encapsulated annular exciting coil 130 are, as shown in FIG. 4A, maintained in a state wherein they are centered between the pair of rotary ferromagnetic pole pieces 106 and 108. Then, if steering torque is exerted to the steering wheel, the cylindrical permanent magnet ring element 104 is rotated relying upon a rotating condition of the valve body, and thereby, as shown in FIG. 4B, centered alignment of magnetic paths is distorted. Due to the magnetic paths which are distorted in this course, as a centered alignment restoring phenomenon occurs, restoring force for returning the cylindrical permanent magnet ring element 104 to its original position is generated, and this restoring force acts as resistant force to steering assistant force.

In this way, by modifying a magnitude of the centered alignment restoring force of the magnetic paths which are induced by the encapsulated annular exciting coil 130, it is possible to regulate steering assistant force depending upon a speed of a vehicle.

However, the electromagnetic, resistant force-generating apparatus 92 according to the conventional art, constructed as mentioned above, suffers from defects in that, since the cylindrical permanent magnet ring element 104 which is formed in a manner such that radially magnetized polarities thereof are repeatedly alternated along the circumferential direction, is intervened between the pair of rotary ferromagnetic pole pieces 106 and 108 for rendering hydraulic actuation of the power steering system and the centered alignment restoring force of the magnetic paths which are induced by the encapsulated annular exciting coil 130, and acts to return the cylindrical permanent magnet ring element 104 to its original position, it is difficult to magnetize the cylindrical permanent magnet ring element 104 in such a manner that polarities thereof are repeatedly alternated along the circumferential direction as described above, whereby productivity is deteriorated.

Further, a power steering apparatus for a motor vehicle with a two piece inner pole member and a method for making the same are disclosed in U.S. Pat. No. 5,931,195 which is issued to Joel Edward Birsching et al. on Aug. 3, 1999 and assigned to General Motors Corporation.

The electromagnetic apparatus disclosed in the '195 patent is provided to vary a magnitude of effective restoring torque of a torsion bar. The electromagnetic apparatus comprises a stationary exciting coil, an inner pole member possessing an extension of a cylindrical valve member having a plurality of outwardly facing teeth, and an outer pole member fixed on a spool shaft for rotation therewith and having an equal plurality of opposing inwardly facing teeth. Here, the inner pole member comprises a hub member formed in an annular cylindrical configuration extending through the coil and made of a first magnetic material having a high magnetization for a given coil current for maximum flux through the coil, and further comprises a tooth member possessing the plurality of outwardly facing teeth and formed of a second magnetic material having a smaller magnetization than the first magnetic material for the given coil current.

However, the electromagnetic apparatus disclosed in the '195 patent, constructed as mentioned above, still encounters a problem in that, since the inner pole member is formed by two magnetic materials having different magnetizations, resistant force is not generated, but only attractive force is generated, and steering force is regulated using this attractive force. Therefore, a regulating range of a default value is reduced to a half when compared to a structure using a permanent magnet. As a result, it is only possible to control steering force in a manner such that steering force is enlarged, that is, the steering wheel is rotated with heavy effort, and it is impossible to control steering force in a manner such that steering force is diminished, that is, the steering wheel is rotated with light effort, whereby satisfiable steering assistant force cannot be accomplished.

SUMMARY OF THE INVENTION

Accordingly, the present invention has been made in an effort to solve the problems occurring in the related art, and an object of the present invention is to provide a power steering system for a motor vehicle, wherein each of a circumferentially-extending radial inner part and a circumferentially-extending radial outer part of a permanent magnet ring which is used in an electromagnetic, resistant force-generating apparatus, is magnetized in a manner such that each of them has a single magnetic polarity, thereby enabling magnetizing works to be easily implemented and improving productivity, and at the same time, magnetic flux which is derived by an exciting coil and magnetic flux which is derived by the permanent magnet ring, are directly opposed to each other, thereby obtaining resistant force through attractive force.

Another object of the present invention is to provide a power steering system for a motor vehicle, wherein a pass plate and a magnetic pole piece sleeve are integrated with each other in such a way as to eliminate a rotation inhibiting factor which otherwise exists due to attractive force through which members connected to the magnetic pole piece sleeve are willing to cling to the pass plate, thereby not inhibiting rotating movement of rotary elements.

In order to achieve the above object, according to the present invention, there is provided a power steering system for a motor vehicle, having an input shaft which is centrally arranged in a housing, a torsion bar which is connected to the inside of the input shaft, a pinion shaft which is connected to a lower end of the input shaft and a valve body which is fitted around a circumferential outer surface of the input shaft, the power steering system obtaining steering assistant force by creating fluid flow, the power steering system comprising: an annular exciting coil wound in a circumferential direction while being centered around the input shaft; a permanent magnet ring disposed in magnetic paths which are induced by the annular exciting coil and securely mounted to the housing, the permanent magnet ring having a circumferentially-extending radial inner part and a circumferentially-extending radial outer part each of which is magnetized to have a single polarity; and inner and outer ferromagnetic pole pieces radially disposed inward of the permanent magnet ring and coupled with each other to be each capable of relative rotation depending upon displacement of the input shaft and the torsion bar, each of the inner and outer ferromagnetic pole pieces being formed with a plurality of teeth in a manner such that the teeth of the inner and outer ferromagnetic pole pieces face each other.

Here, operations of the power steering system according to the present invention, having above-stated features, will be described.

If the magnetic paths are induced as current is applied to the annular exciting coil depending upon a vehicle speed, magnetic force which is generated by the exciting coil, is transferred to the inner ferromagnetic pole piece, and magnetic force which is generated by the permanent magnet ring, is transferred to the outer ferromagnetic pole piece. At this time, by reversing a direction of current which is applied to the exciting coil, if the inner ferromagnetic pole piece has a polarity which is opposite to a polarity of the outer ferromagnetic pole piece by the permanent magnet ring, attractive force is generated between the inner and outer ferromagnetic pole pieces, whereby resistant force which resists relative rotation between the inner and outer ferromagnetic pole pieces, is generated. On the contrary, by reversing again the direction of current which is applied to the exciting coil, if the inner ferromagnetic pole piece has a polarity which is the same as that of the outer ferromagnetic pole piece by the permanent magnet ring, repulsive force is generated between the inner and outer ferromagnetic pole pieces, whereby resistant force which resists relative rotation between the inner and outer ferromagnetic pole pieces, is not generated. Consequently, because it is possible to generate and not to generate, depending upon a vehicle speed, resistant force which resists steering assistant force, through attractive force and repulsive force, respectively, between magnetic force generated by the exciting coil and magnetic force generated by the permanent magnet ring, stable steering capability can be accomplished throughout both low and high speed ranges.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Figure 1:
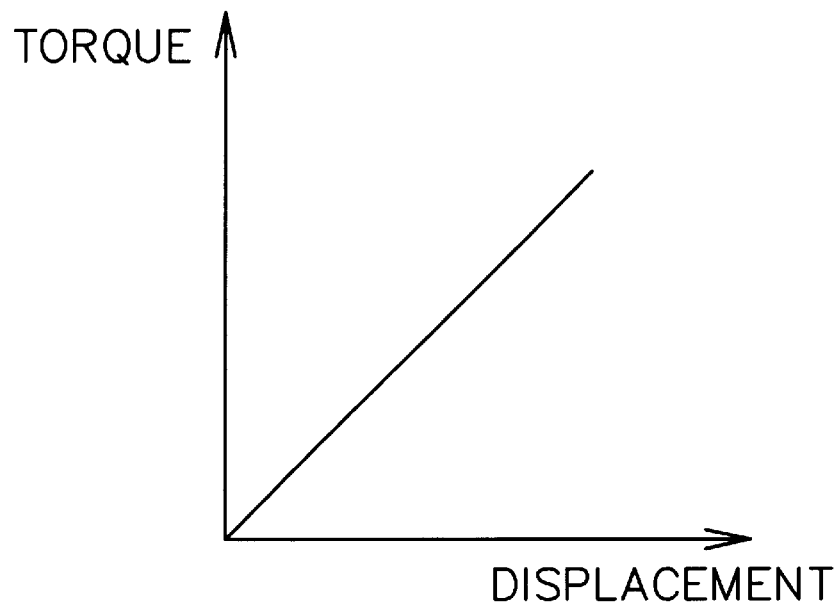
FIG. 1 is a graph illustrating a relationship between steering torque and torsional displacement of a torsion bar in a power steering system for a motor vehicle.
Figure 2:
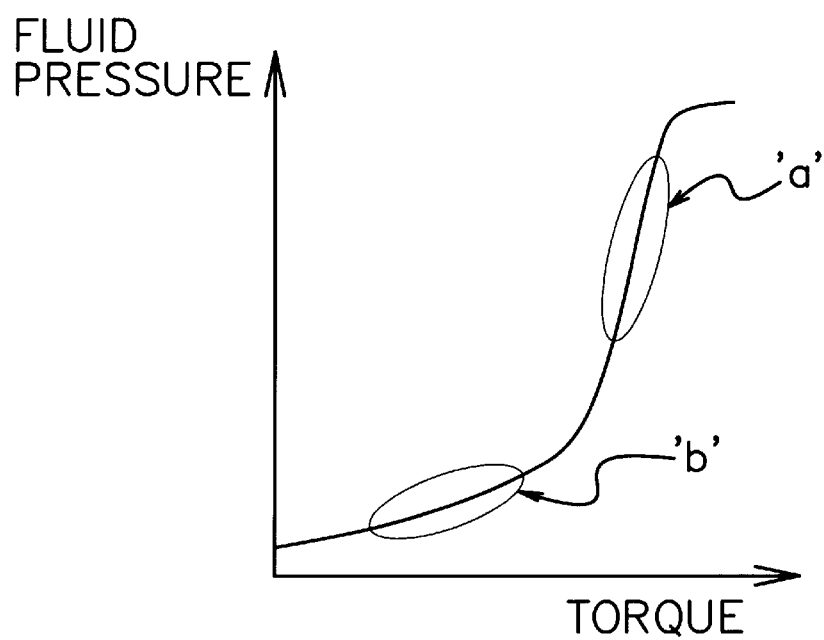
FIG. 2 is a graph illustrating a relationship between steering torque and fluid pressure in a power steering system for a motor vehicle.
Figure 3:
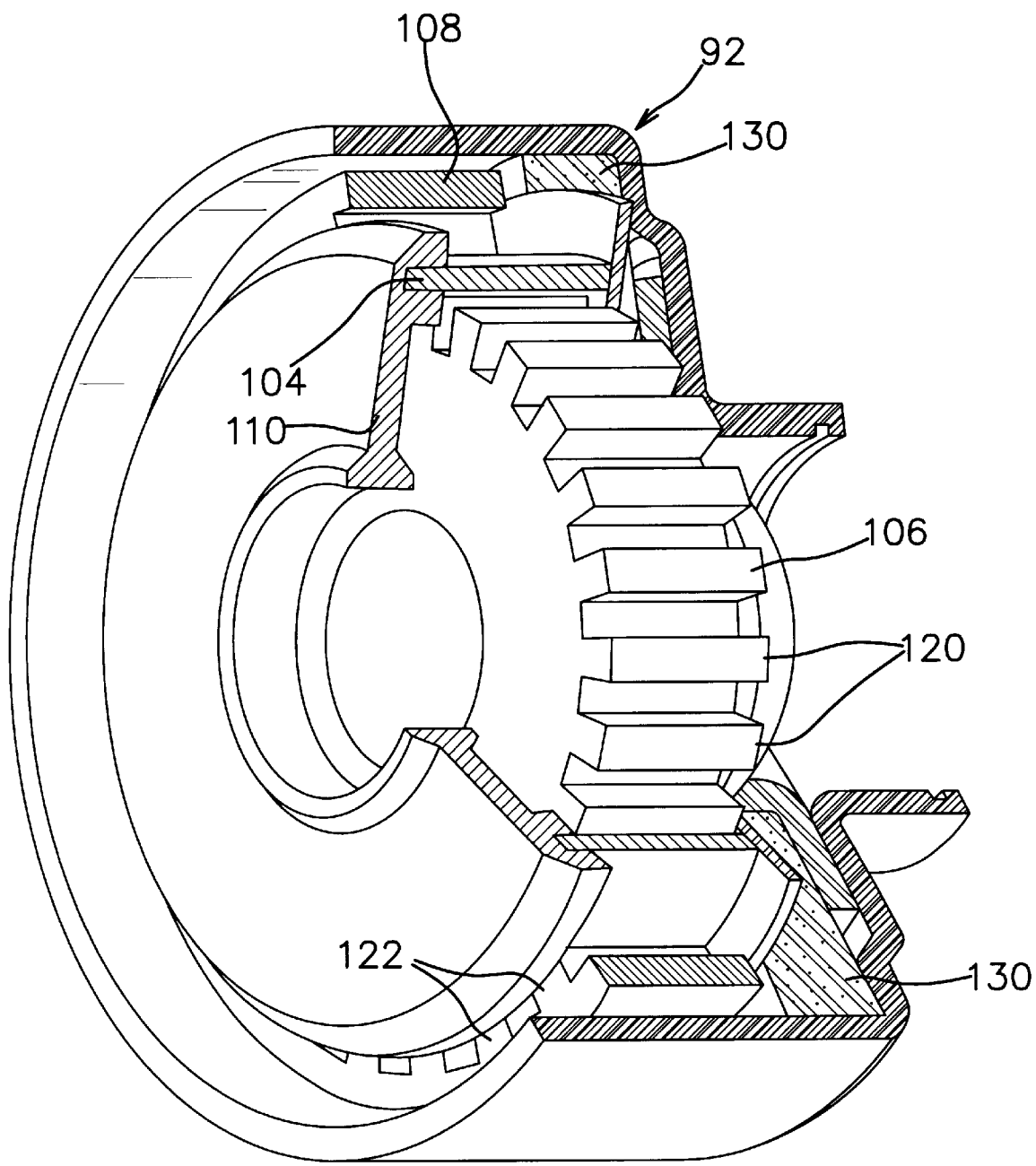
FIG. 3 is a partially broken-away perspective view illustrating an electromagnetic mechanism of an electromagnetic, resistant force-generating apparatus of a conventional power steering system for a motor vehicle.
Figure 4A:
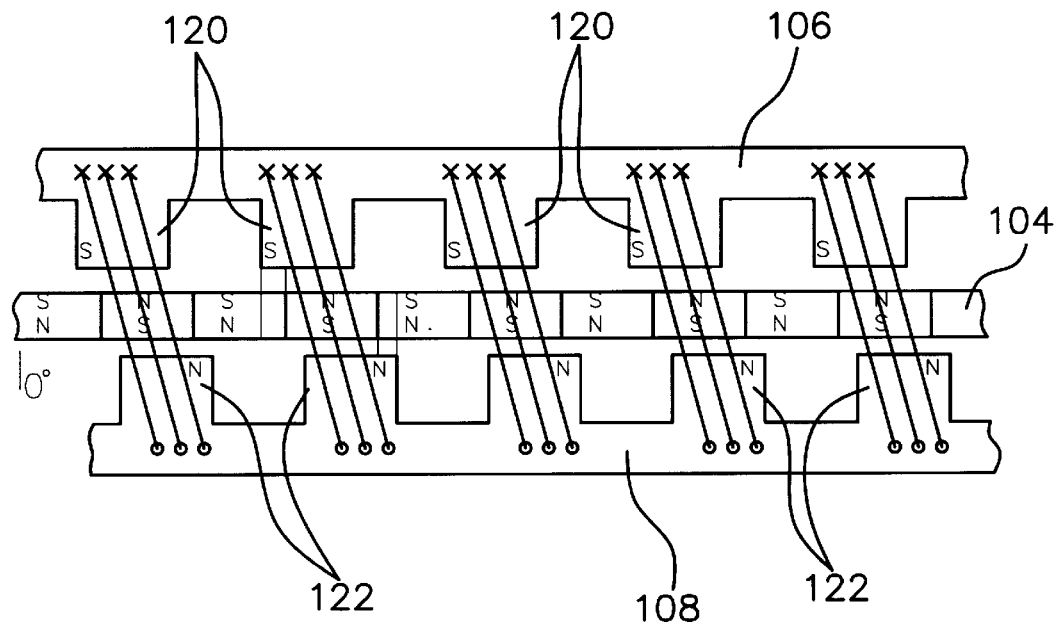
FIG. 4 is a schematic view illustrating magnetic flux of a rotary magnetic circuit of the electromagnetic mechanism of FIG. 3.
Figure 4B:
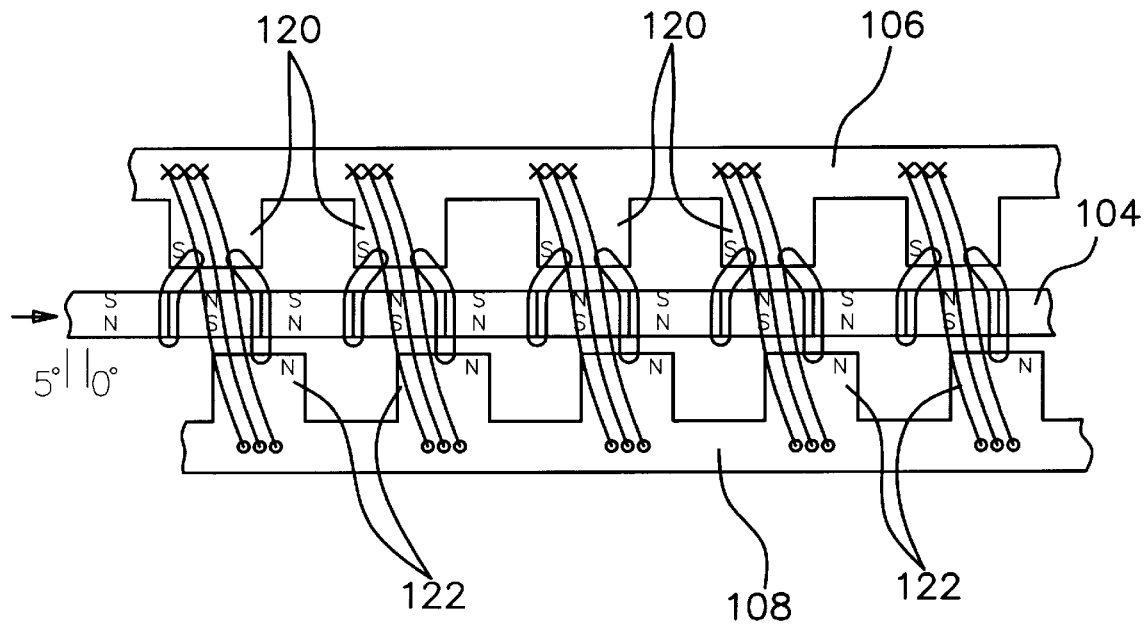

Reference will now be made in greater detail to a preferred embodiment of the invention, an example of which is illustrated in the accompanying drawings. Wherever possible, the same reference numerals will be used throughout the drawings and the description to refer to the same or like parts.

Figure 5:
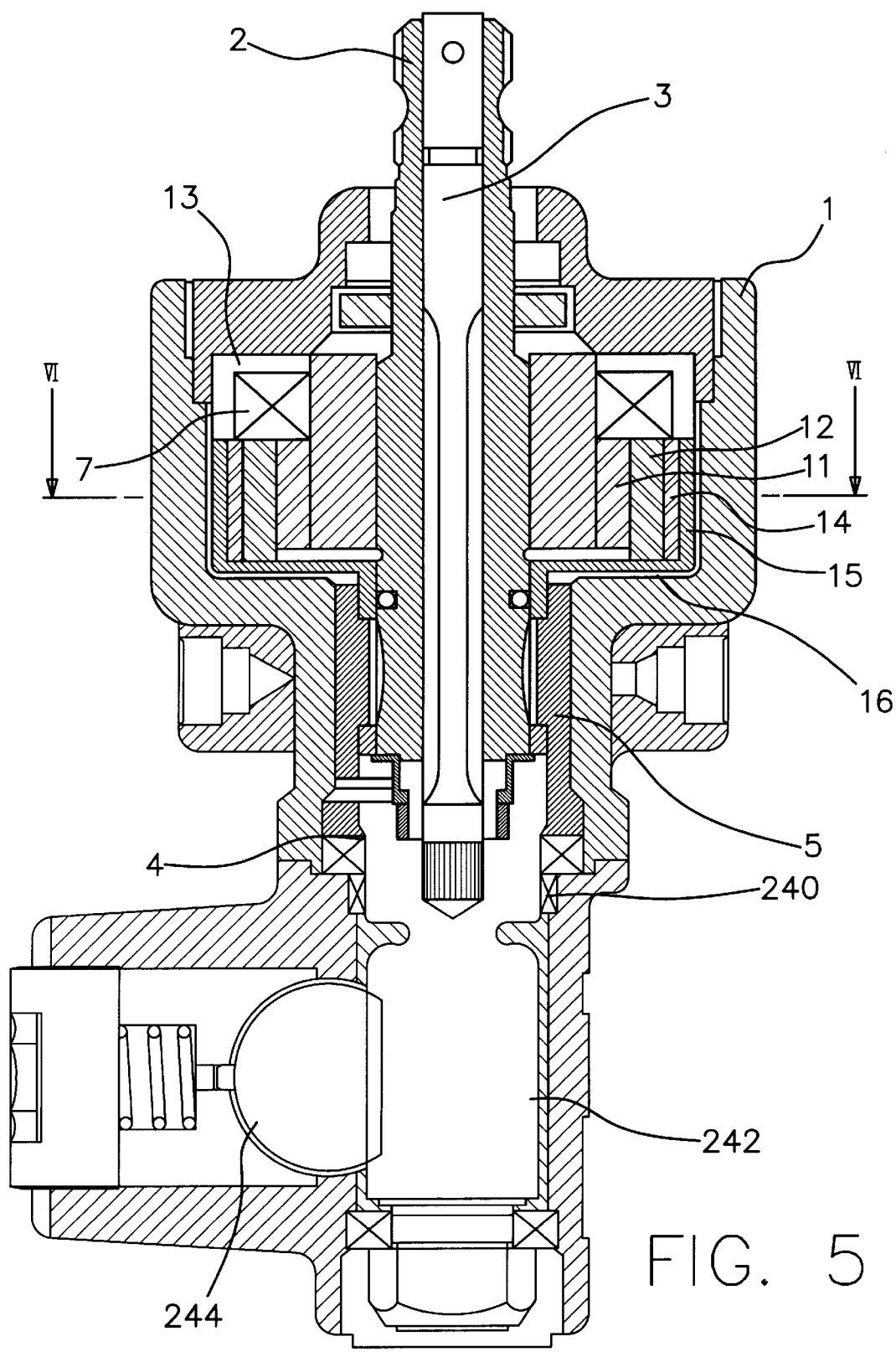
FIG. 5 is a front longitudinal cross-sectional view illustrating an electromagnetic, vehicle speed-responsive, resistant force-generating apparatus of a power steering system for a motor vehicle in accordance with an embodiment of the present invention.
Figure 6:
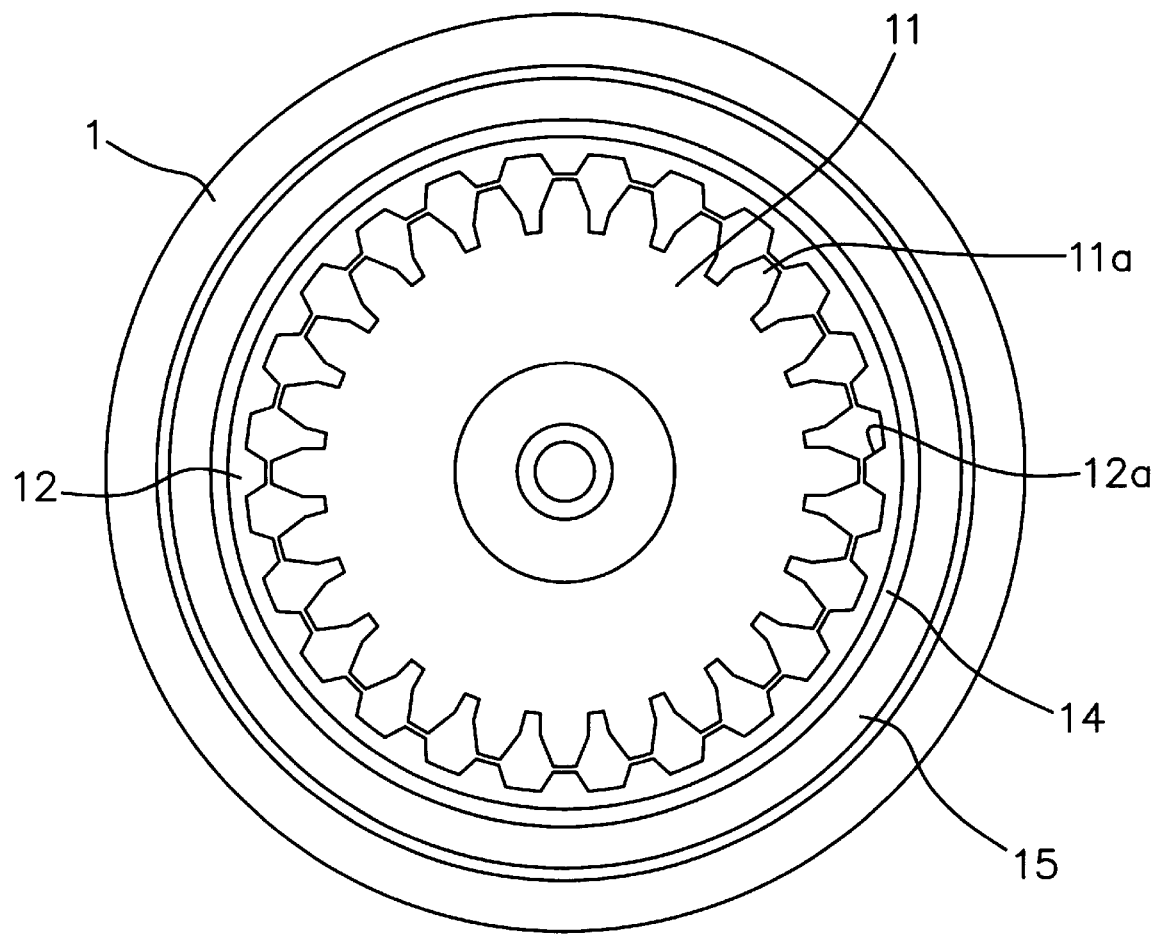
FIG. 6 is a transverse cross-sectional view taken along the line VI—VI of FIG. 5.

FIG. 5 is a front longitudinal cross-sectional view illustrating an electromagnetic, vehicle speed-responsive, resistant force-generating apparatus of a power steering system for a motor vehicle in accordance with an embodiment of the present invention; and FIG. 6 is a transverse cross-sectional view taken along the line VI—VI of FIG. 5.

Generally, a power steering system for a motor vehicle has an input shaft 2 which is centrally arranged in a housing 1, a torsion bar 3 which is connected to the inside of the input shaft 2, a pinion shaft 4 which is connected to a lower end of the input shaft 2, and a valve body 5 which is fitted around a circumferential outer surface of the input shaft 2. In the power steering system, an electromagnetic, vehicle speed-responsive, resistant force-generating apparatus in accordance with an embodiment of the present invention includes an inner toothed member 11 fitted around the circumferential outer surface of the input shaft 2 and having a plurality of teeth 11a which are formed on a lower half of the inner toothed member 11; an outer toothed member 12 having a plurality of teeth 12a which are formed on a circumferential inner surface of the outer toothed member 12 in a manner such that they face the plurality of teeth 11a of the inner toothed member 11; a coil 7 wound through a plurality of turns in a circumferential direction and above the plurality of teeth 11a and 12a of the inner and outer toothed members 11 and 12; a pass plate 13 surrounding an upper surface and a circumferential outer surface of the coil 7, for rendering aid to a formation of magnetic paths; a permanent magnet 14 fitted around the outer toothed member 12; a magnetic pole piece sleeve 15 fitted around the permanent magnet 14; and a non-magnetic pole piece sleeve 16 arranged under the inner toothed member 11, the outer toothed member 12 and the permanent magnet 14. In the electromagnetic, vehicle speed-responsive, resistant force-generating apparatus according to the present invention, the permanent magnet 14 and the outer toothed member 12 have the same one polarity, and the inner toothed member 11 has the other opposite polarity.

In the resistant force-generating apparatus, because of magnetic force which is generated between the pass plate 13 and the magnetic pole piece sleeve 15, attractive force through which the non-magnetic pole piece sleeve 16 and the valve body 5 connected to the magnetic pole piece sleeve 15 are willing to cling to the pass plate 13, is generated. In consideration of this, it can be advantageous that repulsive force acts in view of smooth rotation of the above-mentioned components. To this end, a structure capable of reducing, by repulsive force which is generated between the magnetic pole piece sleeve 15 and the non-magnetic pole piece sleeve 16, resistant force which resists relative rotation therebetween, is illustrated in next embodiment of the present invention.

Operations of the resistant force-generating apparatus constructed as mentioned above will be described herein in association with a high speed running situation of the vehicle. If a driver rotates a steering wheel while running at a high speed, as current is applied to the coil 7, electromagnetic force is generated in the inner toothed member 11. For example, in the present embodiment of the present invention, magnetic paths are induced in a manner such that, if the permanent magnet 14 which is located behind the outer toothed member 12, has an N-polarity, the electromagnetic force of the inner toothed member 11 has an S-polarity, whereby the steering wheel rotating effort is made heavy due to the magnetic force (attractive force) which is generated therebetween. Therefore, when the steering wheel is rotated, because the input shaft 2 which is rotated along with the steering wheel, is not easily rotated, running stability can be secured.

That is to say, if the magnetic paths are induced in a manner such that the outer toothed member 12 is entirely magnetized to have the N-polarity and the inner toothed member 11 is entirely magnetized to have the S-polarity, because the pass plate 13 renders aid to the formation of the magnetic paths, magnetic flux which flows around the coil 7, generates more powerful magnetic force.

Figure 7:
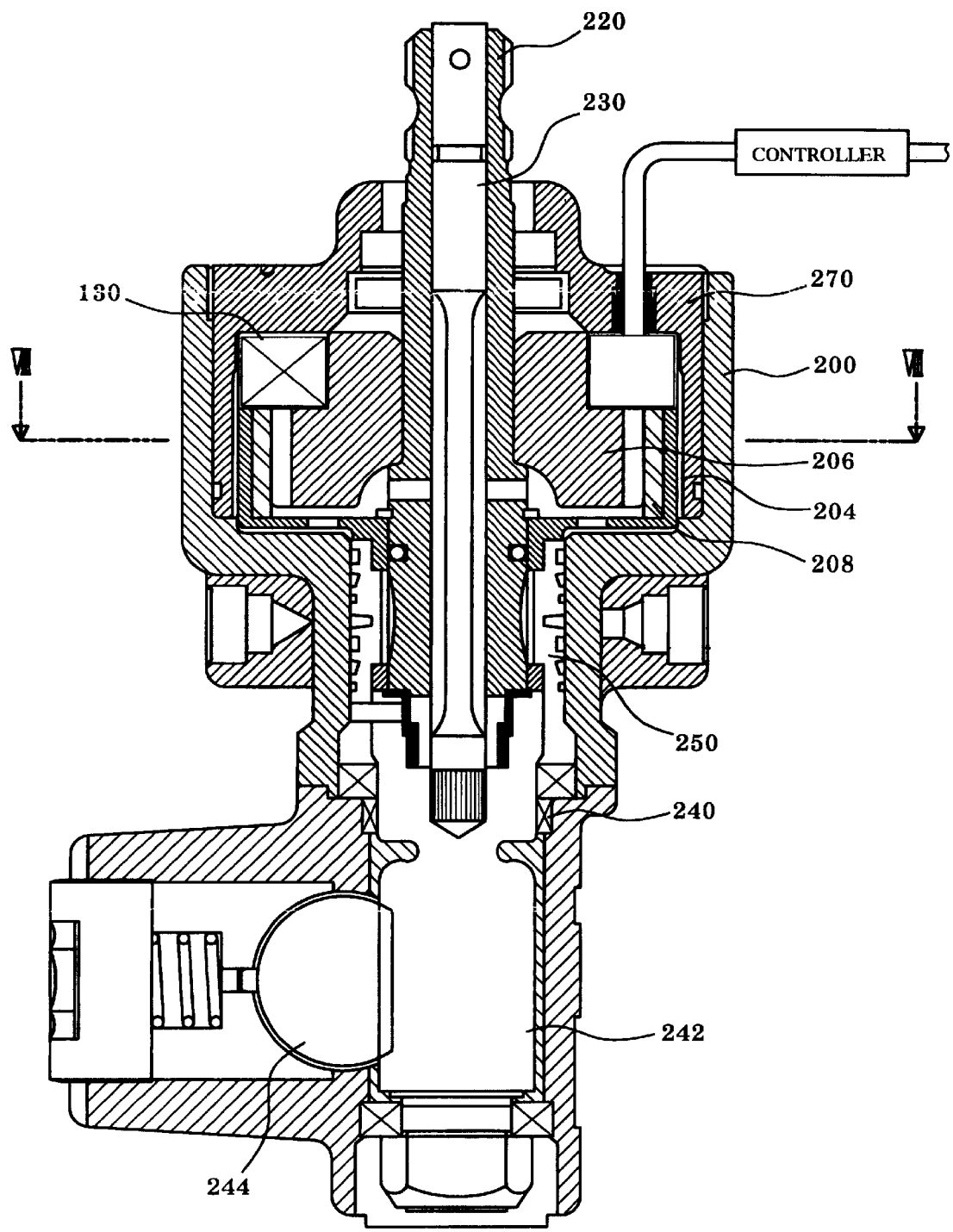
FIG. 7 is a longitudinal cross-sectional view illustrating a power steering system for a motor vehicle in accordance with another embodiment of the present invention.
Figure 8:
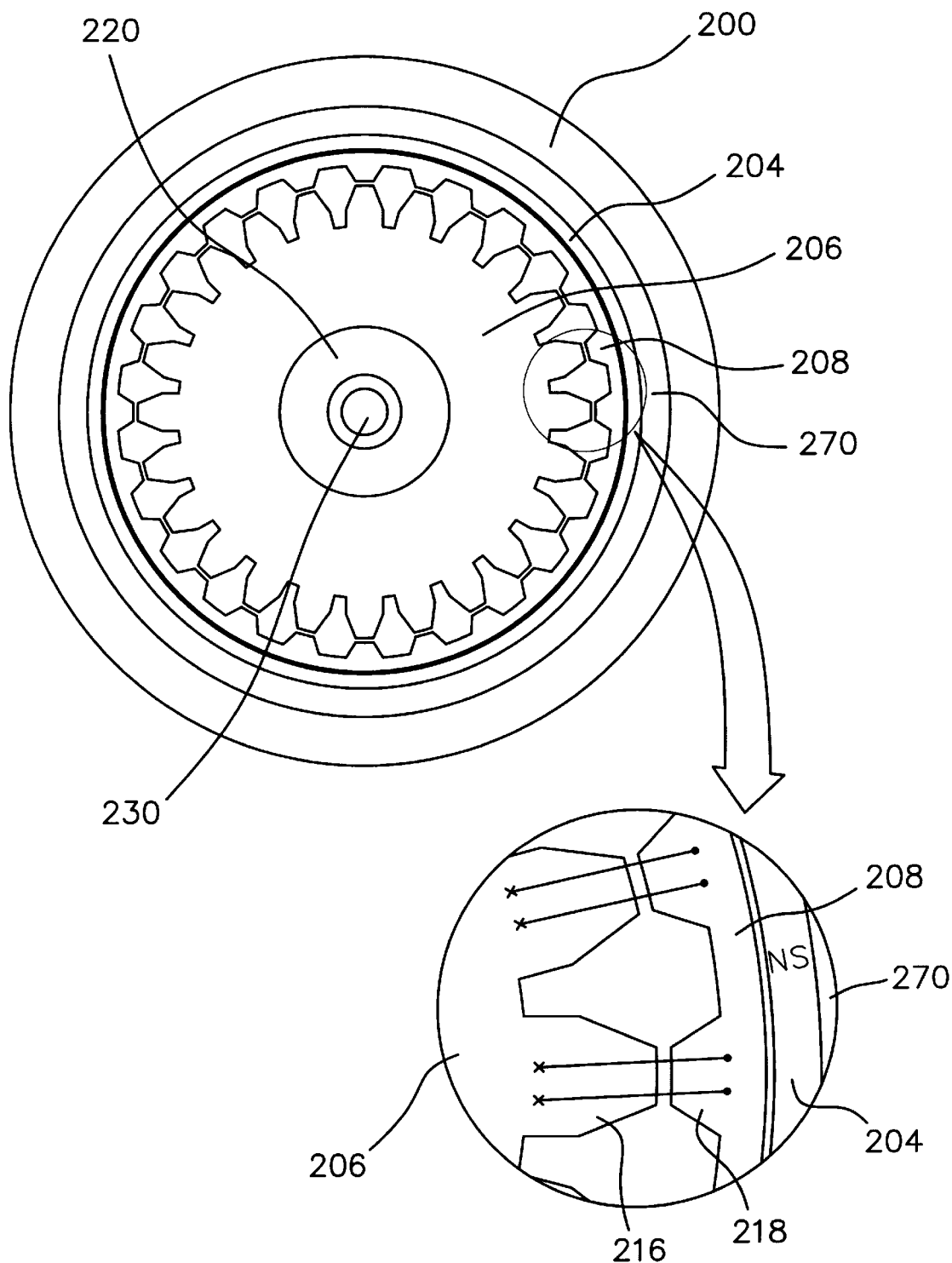
FIG. 8 is a transverse cross-sectional view taken along the line VIII—VIII of FIG. 7.

FIG. 7 is a longitudinal cross-sectional view illustrating a power steering system for a motor vehicle in accordance with another embodiment of the present invention; and FIG. 8 is a transverse cross-sectional view taken along the line VIII—VIII of FIG. 7.

As can be readily seen from FIGS. 7 and 8, a power steering system for a motor vehicle has an input shaft 220 which is mounted at a center portion of a first housing 200, a torsion bar 230 which is inserted into the input shaft 220, a pinion shaft 240 which is connected to a lower end of the input shaft 220, and a valve body 250 which is fitted around a circumferential outer surface of the input shaft 220. A pinion 242 which is formed on a circumferential outer surface of the pinion shaft 240, is meshed with a rack 244. Manipulating force of a steering wheel which is transferred to the input shaft 220, is again transferred to an output shaft through the pinion 242 and the rack 244, thereby to rotate steerable wheels in a rotating direction.

In the power steering system, an electromagnetic, vehicle speed-responsive, resistant force-generating apparatus in accordance with this second embodiment of the present invention includes an annular exciting coil 130 wound in a circumferential direction while being centered around the input shaft 220; a second housing 270 securely mounted to the first housing 200 for forming magnetic paths which are induced by the annular exciting coil 130; a permanent magnet ring 204 securely mounted to the second housing 270 and having a circumferentially-extending radial inner part and a circumferentially-extending radial outer part each of which is magnetized to have a single polarity; and inner and outer ferromagnetic pole pieces 206 and 208 radially disposed inward of the permanent magnet ring 204 and coupled with each other to be each capable of relative rotation depending upon displacement of the input shaft 220 and the torsion bar 230, each of the inner and outer ferromagnetic pole pieces 206 and 208 being formed with a plurality of teeth 216 or 218 in a manner such that the teeth 216 and 218 of the inner and outer ferromagnetic pole pieces 206 and 208 face each other.

The outer ferromagnetic pole piece 208 is located in a manner such that a predetermined gap is defined between the outer ferromagnetic pole piece 208 and the permanent magnet ring 204, thereby to be capable of being rotated depending upon the movement of the input shaft 220.

At this time, if current is applied to the annular exciting coil 130, as shown in FIG. 8, magnetic paths are formed through the inner ferromagnetic pole piece 206, the outer ferromagnetic pole piece 208, the permanent magnet ring 204 and the second housing 270.

As best shown in FIG. 8, magnetic flux which is derived by the annular exciting coil 130, flows also through the inner ferromagnetic pole piece 206, the outer ferromagnetic pole piece 208, the permanent magnet ring 204 and the second housing 270. On the other hand, in the case that a direction of magnetic flux which is derived by the annular exciting coil 130 is reversed, the magnetic flux flows in a reverse order, that is, through the second housing 270, the permanent magnet ring 204, the outer ferromagnetic pole piece 208 and the inner ferromagnetic pole piece 206.

Hereinafter, a resistant force generating procedure of the power steering system by using electromagnetic force will de described in detail with reference to FIG. 9. FIG. 9 is a schematic view illustrating magnetic flux which is derived by an exciting coil as shown in FIG. 7.

Figure 9A:
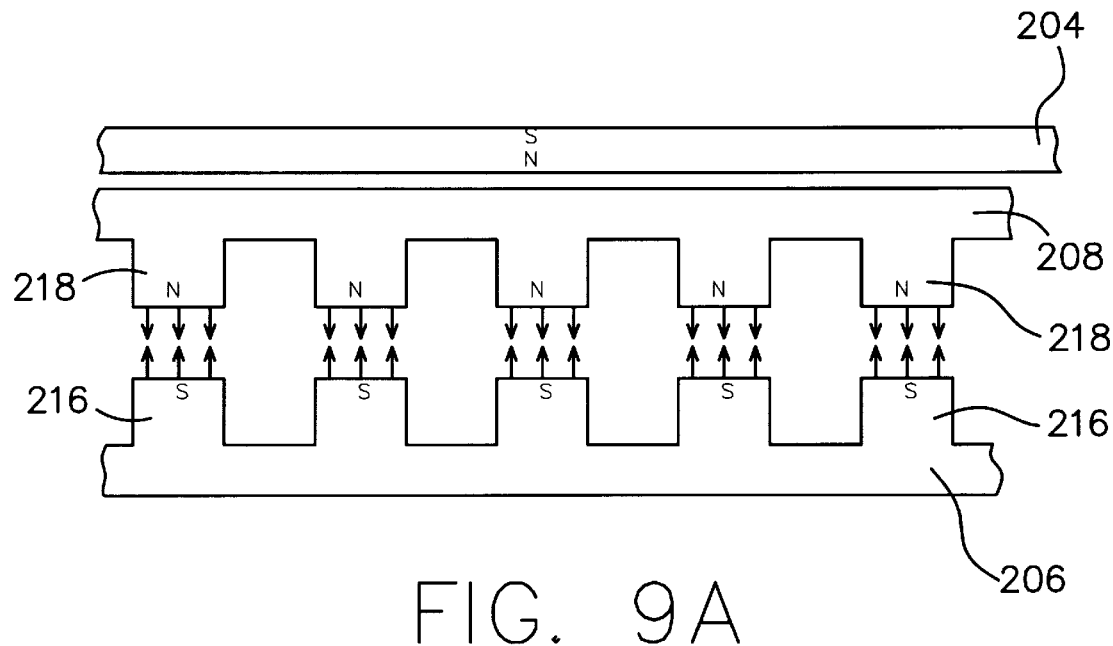
FIG. 9 is a schematic view illustrating magnetic flux which is derived by an exciting coil as shown in FIG. 7.
Figure 9B:
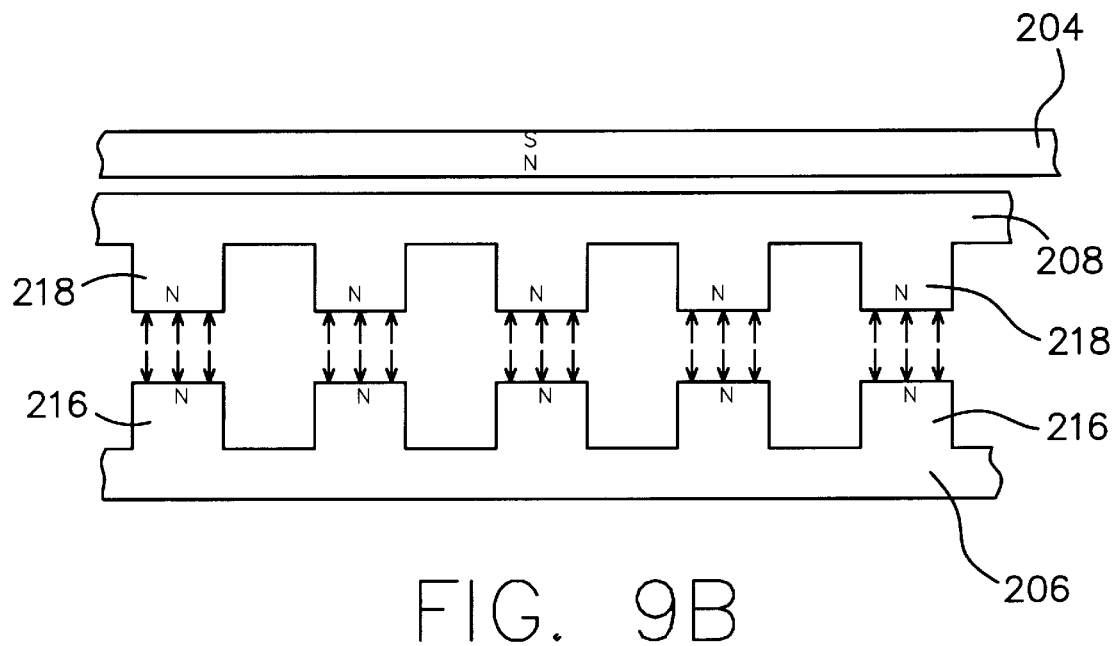

FIG. 9A represents a state wherein attractive force acts between the inner ferromagnetic pole piece 206 and the outer ferromagnetic pole piece 208, and FIG. 9B represents a state wherein repulsive force acts between the inner ferromagnetic pole piece 206 and the outer ferromagnetic pole piece 208.

First, as shown in FIG. 9A, if current is applied to the annular exciting coil 130 through a control unit thereby to enable powerful resistant force which resists the manipulation force of the driver, to be generated, the plurality of teeth 216 of the inner ferromagnetic pole piece 206 are magnetized to have an S-polarity. At this time, the plurality of teeth 218 of the outer ferromagnetic pole piece 208 are magnetized by the permanent magnet ring 204 to have an N-polarity. Accordingly, powerful attractive force acts between the inner ferromagnetic pole piece 206 and the outer ferromagnetic pole piece 208, thereby to provide powerful resistant force which resists the torsion of the torsion bar 230.

Also, as shown in FIG. 9B, if current which reversed in its direction is applied to the annular exciting coil 130 through the control unit thereby to enable resistant force which resists the manipulation force of the driver, not to be generated, the plurality of teeth 216 of the inner ferromagnetic pole piece 206 are magnetized to have the N-polarity. At this time, the plurality of teeth 218 of the outer ferromagnetic pole piece 208 are magnetized by the permanent magnet ring 204 to have the N-polarity. Accordingly, powerful repulsive force acts between the inner ferromagnetic pole piece 206 and the outer ferromagnetic pole piece 208, thereby not to impose adverse influence on the torsion of the torsion bar 230.

Figure 10:
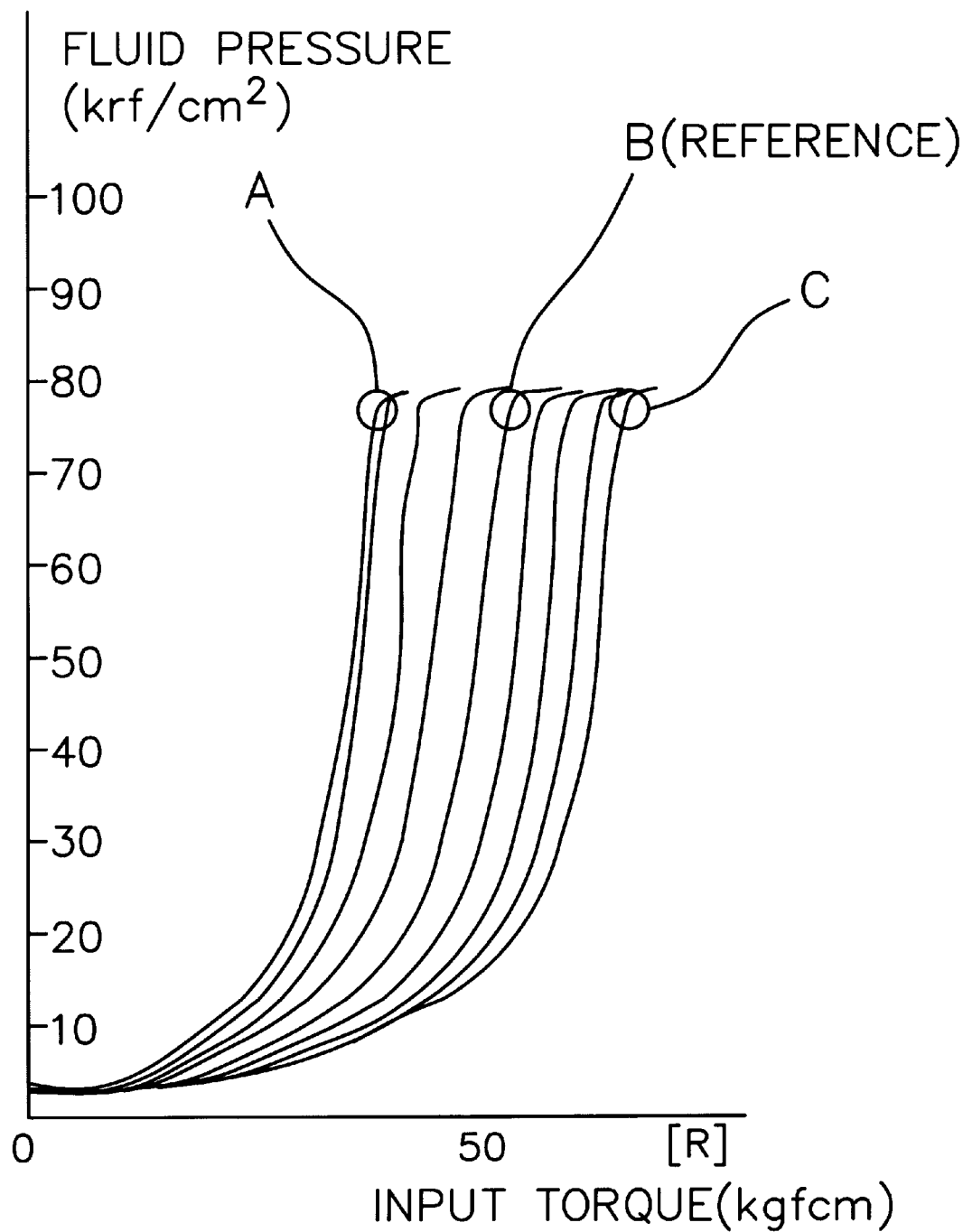
FIG. 10 is a graph illustrating a relationship between input steering torque and fluid pressure in the power steering system for a motor vehicle according to the present invention.

FIG. 10 is a graph illustrating a relationship between input steering torque and fluid pressure in the power steering system for a motor vehicle according to the present invention.

As can be readily seen from FIG. 10, as a magnitude of the current which is applied to the annular exciting coil 130, is increased in a positive direction, resultant curved lines are moved rightward on the graph. Therefore, it is possible to obtain a characteristic in which input steering torque is increased at the same fluid pressure.

Namely, the curved line 'A' denotes steering torque upon parking, the curved line 'B' denotes steering torque upon medium speed running, and the curved line 'C' denotes steering torque upon high speed running.

Moreover, as a magnitude of the current which is applied to the annular exciting coil 130, is increased in a negative direction, resultant curved lines are moved leftward on the graph. Therefore, it is possible to obtain a characteristic in which input steering torque is decreased at the same fluid pressure.

Consequently, by regulating a magnitude and a direction of the current which is applied to the annular exciting coil 130, it is possible to accomplish different manipulation force of the steering wheel with the same torsional characteristic of the torsion bar 230, throughout the parking situation, the low speed running situation and the high speed running situation.

As described above, the power steering system for a motor vehicle according to the present invention provides advantages in that, since it is possible to generate, by using attractive force and repulsive force between magnetic force produced by an exciting coil and magnetic force produced by a permanent magnet, proper resistant force which resists steering assistant force, stable steering capability can be achieved throughout both a low speed range and a high speed range.

Furthermore, by the fact that the permanent magnet has a circumferentially-extending radial inner part and a circumferentially-extending radial outer part each of which is magnetized to have a single polarity, magnetizing works can be easily implemented and thereby productivity is improved.

In addition, because a pass plate and a magnetic pole piece sleeve which form magnetic paths, are integrated with each other, it is possible not to inhibit the rotating movement of rotary elements.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A power steering system for a motor vehicle, having an input shaft which is centrally arranged in a housing, a torsion bar which is connected to an inside of the input shaft, a pinion shaft which is connected to a lower end of the input shaft and a valve body which is fitted around a circumferential outer surface of the input shaft, the power steering system obtaining steering assistant force by creating fluid flow, the power steering system comprising:

an inner toothed member fitted around the circumferential outer surface of the input shaft and having a plurality of teeth which are formed on a lower half of the inner toothed member;

an outer toothed member having a plurality of teeth which are formed on a circumferential inner surface of the outer toothed member in a manner such that they face the plurality of teeth of the inner toothed member;

a coil wound through a plurality of turns in a circumferential direction and above the plurality of teeth of the inner and outer toothed members;

a pass plate surrounding an upper surface and a circumferential outer surface of the coil, for rendering aid to a formation of magnetic paths;

a permanent magnet fitted around the outer toothed member;

a magnetic pole piece sleeve fitted around the permanent magnet; and a non-magnetic pole piece sleeve arranged under the inner toothed member, the outer toothed member and the permanent magnet, the permanent magnet and the outer toothed member having a same one polarity, the inner toothed member having an opposite polarity.

2. A power steering system for a motor vehicle, having an input shaft which is centrally arranged in a housing, a torsion bar which is connected to an inside of the input shaft, a pinion shaft which is connected to a lower end of the input shaft and a valve body which is fitted around a circumferential outer surface of the input shaft, the power steering system obtaining steering assistant force by creating fluid flow, the power steering system comprising:

an annular exciting coil wound in a circumferential direction while being centered around the input shaft;

a permanent magnet ring disposed in magnetic paths which are induced by the annular exciting coil and securely mounted to the housing, the permanent magnet ring having a circumferentially-extending radial inner part and a circumferentially-extending radial outer part each of which is magnetized to have a single polarity; and inner and outer ferromagnetic pole pieces radially disposed inward of the permanent magnet ring and coupled with each other to be each capable of relative rotation depending upon displacement of the input shaft and the torsion bar, each of the inner and outer ferromagnetic pole pieces being formed with a plurality of teeth in a manner such that the teeth of the inner and outer ferromagnetic pole pieces face each other.

* * * * *